Nov. 14, 1950     A. FEY     2,530,008
FISH LURE
Filed Aug. 29, 1947
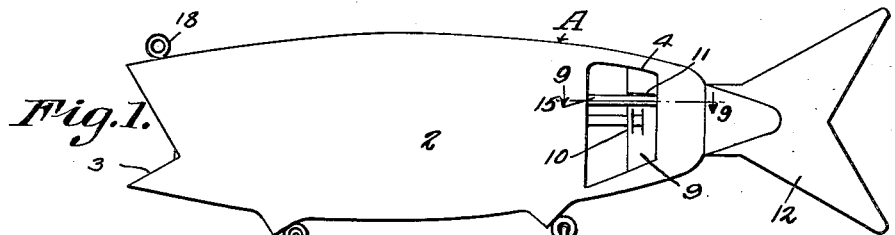
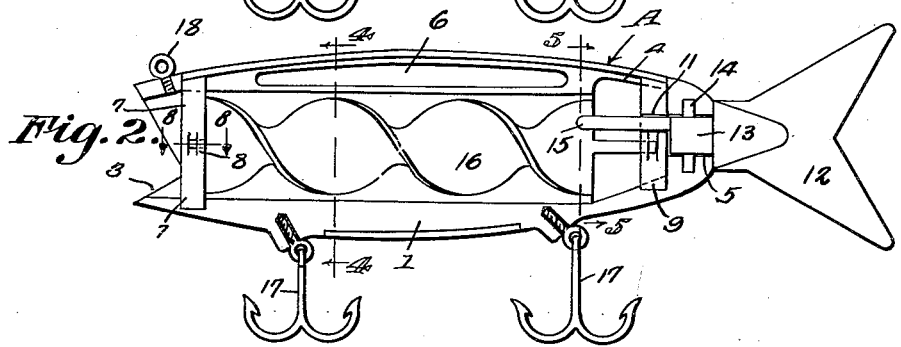
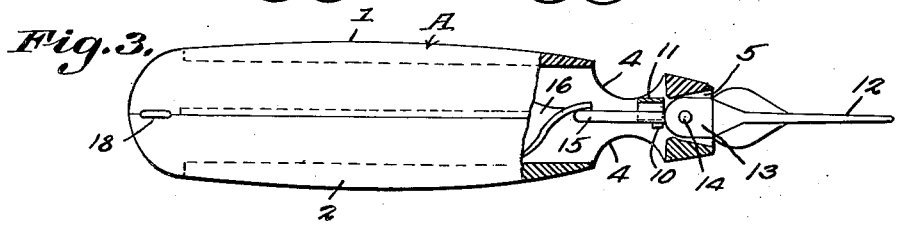
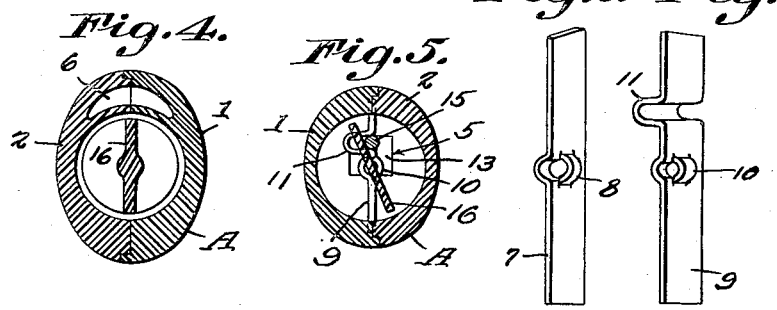
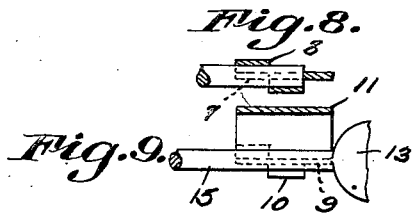
Albert Fey
INVENTOR
BY C. A. Snow & Co.
ATTORNEYS.

Patented Nov. 14, 1950

2,530,008

UNITED STATES PATENT OFFICE 2,530,008

FISH LURE

Albert Fey, Detroit, Mich., assignor to Makall Corporation, Detroit, Mich., a corporation of Michigan Application August 29, 1947, Serial No. 771,167

2 Claims. (Cl. 43—26.2)

This invention relates to fishing lures and more particularly and specifically to artificial fishing bait resembling live bait and having animation like that of live bait.

The primary object of this invention resides in the provision of an artificial bait structure resembling a minnow or other like live bait and a structure having means causing the lure to assume an erratic, animated movement resembling the swimming movement of such a live bait member as the lure is drawn through the water.

Another object of this invention lies in the provision of an artificial lure which carries fish hooks externally where they will securely hook any fish striking the lure, and the lure carries an eye member forward enabling the lure to be secured to the end of a fishing line.

Still another object of this invention is the provision of an artificial lure of the character set forth which is of an extremely simple, durable and inexpensive design and construction.

Still further improvements and advantages of this invention will readily appear to those skilled in the art when the following description is read in the light of the accompanying drawings in which:

Fig. 1 is a side elevation of the lure.

Fig. 2 is an elevational view taken from the inner side of one of the sections of the body of the lure.

Fig. 3 is a partial horizontal section of a top plan view of the lure.

Fig. 4 is a vertical section taken on line 4—4 of Fig. 2.

Fig. 5 is a vertical section taken on line 5—5 of Fig. 2.

Fig. 6 is a perspective elevation of the forward shaft bar.

Fig. 7 is a perspective elevation of the rearward shaft bar.

Fig. 8 is a horizontal section through the rear bearing taken on line 8—8 of Fig. 2.

Fig. 9 is a horizontal section through the rear bar taken on line 9—9 of Fig. 1.

Referring now to the accompanying drawings, which are merely illustrative of the preferred embodiment of this invention, and in which like characters indicate similar parts throughout, A designates the body of the lure comprising an elongated member of tapering oval cross section which is composed of a pair of semi-oval pieces 1 and 2 joined in a tongue and groove fit on adjacent faces. These members 1 and 2 when joined to form the body A are shaped like the body of a minnow or the like which is hollowed centrally on the longitudinal axis having an open mouth 3 opening from the front into the hollow center and a pair of opposed openings 4 in the body sides just forward of the tail end of the body which also has a centrally formed outlet 5 therein having outwardly tapered walls.

An elongated hollow chamber 6 is formed between the members 1 and 2 of the body A longitudinally above the hollow portion throughout a substantial portion of the body member adding to the buoyancy of the body member.

A flat elongated bar 7 is secured vertically within the main hollow portion of the body A just within the open mouth, and a circular bearing 8 is formed in the bar 7 intermediate the bar height disposed longitudinally with the body, while a similar bar 9 is supported just forward of the tail end of the body with a second bearing 10 disposed in alignment with the first said bearing. A transverse notch 11 is formed above and in parallel alignment with the bearing 10, providing a stop into which the projected piece 15 moves, restricting movement of the tail member 12 in one direction.

The fin-like tail member 12 is provided with a semi-circular, centrally projected, piece 13 which is rotatably supported on a vertical pin 14 within the tapered aperture 5 is pivotable within the limits of the tapered walls of this aperture. The semi-circular member 13 is provided with an inwardly projected piece 15 which lies in the notched aperture 11 in the rearward bar 9 and extends further therebeyond into the interior of the body.

An elongated helical strip 16 has its ends rotatably mounted in the bearings 8 and 9, the main portion of the helical strip operating between the bearings 8 and 10 of the two bars 7 and 9 with the rear end of the strip projecting beyond the inner end of the tail projection 15 and lying in close adjacent relationship therewith.

Additional features of the lure lie in the provision of a pair of gang type hooks 17 secured in axially spaced apart positions along the underside of the lure body, and an eye 18 secured to the front end of the body just behind the mouth portion for securing a fishing line thereto.

In operation, the lure is drawn through the water and water enters the open mouth to pass by the helical strip 16 to discharge through the side openings 4 just ahead of the tail end of the body.

The water passing through the body causes a rotation of the helical strip in the bearings supporting it and the rotation of the strip 16 causes a sidewise undulation of the tail projection 15 in one direction. As the end of the strip 16 moves over the member 15, the pressure of the water against the tail member 12 which has now been moved laterally, returns the tail member 12 to a position in a direct line with the body A, as shown by Fig. 3. As the helical strip continues to rotate, it again moves to a position to strike the member 15 thus causing the same motion to be transferred to the finned tail which acts as a rudder to impart an erratic movement to the lure as it is drawn through the water.

Thus it may be seen that an inexpensive and durable lure having life-like qualities has been provided and I fully believe that I have contemplated any and all modifications which fall within the scope of the appended claims.

I claim:

1. A fish lure comprising an elongated hollow body formed to simulate live bait, the ends of the body being open whereby water passes through the body, a pivoted rudder-like tail piece mounted at the rear end of the body, a projection connected with the tail piece extending forwardly within the body, a helical rotatable strip disposed longitudinally within the body, one end thereof engaging the projection of the tail piece at intervals, moving the projection and tail piece in one direction as the helical strip moves therewith, and means for limiting movement of the tail piece in one direction.

2. A fish lure comprising an elongated hollow body having open ends whereby water passes directly through the body, a pivoted rudder-like tail piece mounted at the rear end of the body, a projection connected with the tail piece and extending forwardly into the body, front and rear vertical bars having bearings, one of said bars having a notch into which the projection of the rudder moves, restricting movement of the tail piece in one direction, a helical plate disposed longitudinally within the body, said helical plate operating within the bearings, one end of the helical plate engaging the projection during rotation of the helical plate, moving the tail piece laterally in one direction, guiding the body, and means for limiting movement of the projection and tail piece in one direction.

ALBERT FEY.

REFERENCES CITED

The following references are of record in the file of this patent:

UNITED STATES PATENTS

| Number | Name | Date |
|---|---|---|
| 990,984 | Immell | May 2, 1911 |
| 1,390,601 | Caldwell | Sept. 13, 1921 |
| 2,229,369 | Buettner | Jan. 21, 1941 |